US012745242B2

(12) United States Patent
Tang

(10) Patent No.: US 12,745,242 B2
(45) Date of Patent: Sep. 22, 2026

(54) INDICATION/REPORT REPETITION INFORMATION'S PROCEDURE FOR PUCCH HARQ FEEDBACK FOR MSG4

(71) Applicant: MediaTek Singapore Pte. Ltd., Singapore (SG)

(72) Inventor: Wen Tang, Beijing (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 352 days.

(21) Appl. No.: 18/520,666

(22) Filed: Nov. 28, 2023

(65) Prior Publication Data

US 2024/0172222 A1 May 23, 2024

Related U.S. Application Data

(63) Continuation-in-part of application No. 18/386,276, filed on Nov. 2, 2023.

(30) Foreign Application Priority Data

Nov. 23, 2023 (CN) ........................ 202311572601.5

(51) Int. Cl.
*H04L 12/00* (2006.01)
*H04B 17/318* (2015.01)
(Continued)

(52) U.S. Cl.
CPC ...... *H04W 72/1268* (2013.01); *H04B 17/328* (2023.05); *H04L 1/1812* (2013.01);
(Continued)

(58) Field of Classification Search
CPC ....... H04L 1/08; H04L 1/1825; H04L 1/1829; H04L 1/1867; H04L 1/1854; H05L 5/00
(Continued)

(56) References Cited

U.S. PATENT DOCUMENTS

2020/0267597 A1* 8/2020 Huang .................. H04L 1/1812
2021/0251016 A1 8/2021 Xiong et al.
(Continued)

FOREIGN PATENT DOCUMENTS

WO 2022061881 A1 3/2022

OTHER PUBLICATIONS

3GPP TSG-RAN WG1 Meeting #84, R1-161089, St George's Bay, Malta, Nov. 15-19, 2016.
European Patent Office, Mar. 27, 2024, Germany.

*Primary Examiner* — Frantz Coby
(74) *Attorney, Agent, or Firm* — Troutman Pepper Locke LLP; Tim Tingkang Xia, Esq.

(57) ABSTRACT

A UE receives a system information block (SIB) from a base station. The UE determines whether the SIB includes a set of candidate repetition factors for physical uplink control channel (PUCCH) transmissions. The UE transmits, to the base station in a message of a random access procedure, an indication of a capability of the UE for PUCCH repetition in response to determining that the SIB includes the set of candidate repetition factors. When the UE has the capability, the UE determines a particular repetition factor based on at least one of the set of candidate repetition factors and a dynamic indication of a repetition factor. When the UE has the capability, the UE further transmits an acknowledgement (ACK) or negative acknowledgement (NACK) of a message 4 of the random access procedure in a PUCCH in accordance with the particular repetition factor.

18 Claims, 11 Drawing Sheets

(51) Int. Cl.
*H04L 1/1812* (2023.01)
*H04L 5/00* (2006.01)
*H04W 72/1268* (2023.01)
*H04W 72/232* (2023.01)
*H04W 72/51* (2023.01)
*H04W 74/0833* (2024.01)

(52) U.S. Cl.
CPC .......... *H04L 5/0012* (2013.01); *H04L 5/0053* (2013.01); *H04W 72/232* (2023.01); *H04W 72/51* (2023.01); *H04W 74/0833* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 2022/0217787 | A1* | 7/2022 | Zhang | H04W 74/002 |
| 2022/0232639 | A1* | 7/2022 | Wang | H04L 5/0053 |
| 2023/0180237 | A1* | 6/2023 | Yoshimura | H04L 1/1896<br>370/329 |
| 2023/0199796 | A1* | 6/2023 | Cirik | H04L 1/08 |
| 2024/0114522 | A1* | 4/2024 | Cozzo | H04L 1/1854 |

* cited by examiner

900

| Field | | Octet |
|---|---|---|
| R | Timing Advance Command | Oct 1 |
| Timing Advance Command | UL Grant | Oct 2 |
| UL Grant | | Oct 3 |
| UL Grant | | Oct 4 |
| UL Grant | | Oct 5 |
| Temporary C-RNTI | | Oct 6 |
| Temporary C-RNTI | | Oct 7 |

FIG. 11

INDICATION/REPORT REPETITION INFORMATION'S PROCEDURE FOR PUCCH HARQ FEEDBACK FOR MSG4

CROSS-REFERENCE TO RELATED APPLICATION(S)

This application claims the benefits of PCT Application Number PCT/CN2022/135703, entitled "INDICATION/REPORT REPETITION INFORMATION'S PROCEDURE FOR PUCCH HARQ FEEDBACK FOR MSG4" and filed on Nov. 30, 2022, and is a Continuation-in-Part of U.S. Nonprovisional patent application Ser. No. 18/386,276 filed on Nov. 2, 2023, entitled "REPETITION INDICATION FOR PUCCH HACK-ACK FOR MSG4" and assigned to the assignee hereof: both applications are expressly incorporated by reference herein in their entirety.

BACKGROUND

Field

The present disclosure relates generally to communication systems, and more particularly, to techniques of indicating a number of repetitions for Physical Uplink Control Channel (PUCCH) transmissions.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives a system information block (SIB) from a base station. The UE determines whether the SIB includes a set of candidate repetition factors for physical uplink control channel (PUCCH) transmissions. The UE transmits, to the base station in a message of a random access procedure, an indication of a capability of the UE for PUCCH repetition in response to determining that the SIB includes the set of candidate repetition factors. When the UE has the capability, the UE determines a particular repetition factor based on at least one of the set of candidate repetition factors and a dynamic indication of a repetition factor. When the UE has the capability, the UE further transmits an acknowledgement (ACK) or negative acknowledgement (NACK) of a message 4 of the random access procedure in a PUCCH in accordance with the particular repetition factor.

In another aspect of the disclosure, a method, a computer-readable medium, and an apparatus are provided. The apparatus may be a UE. The UE performs at least one of: a first determination of (a) whether a Bandwidth Part (BWP) selected for a random access procedure is configured with a set of random access (RA) resources indicating Msg3 repetition and Msg4 Hybrid Automatic Repeat Request (HARQ) acknowledgement (ACK) repetition as well as other RA resources not indicating Msg3 repetition or Msg4 HARQ ACK repetition: and (b) whether a reference signal received power (RSRP) of a downlink reference signal is less than a threshold: and a second determination of whether the BWP is configured with the set of RA resources indicating the Msg3 repetition and the Msg4 HARQ ACK repetition and configured with no other RA resources. In response to one of the first determination and the second determination being true, the UE determines that Msg3 repetition and Msg4 HARQ-ACK repetition are applicable for the random access procedure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 11 is a diagram illustrating techniques of determine whether Msg3 repetition and Msg4 HARQ-ACK repetition are applicable for a random access procedure.

DETAILED DESCRIPTION

Figure 1:
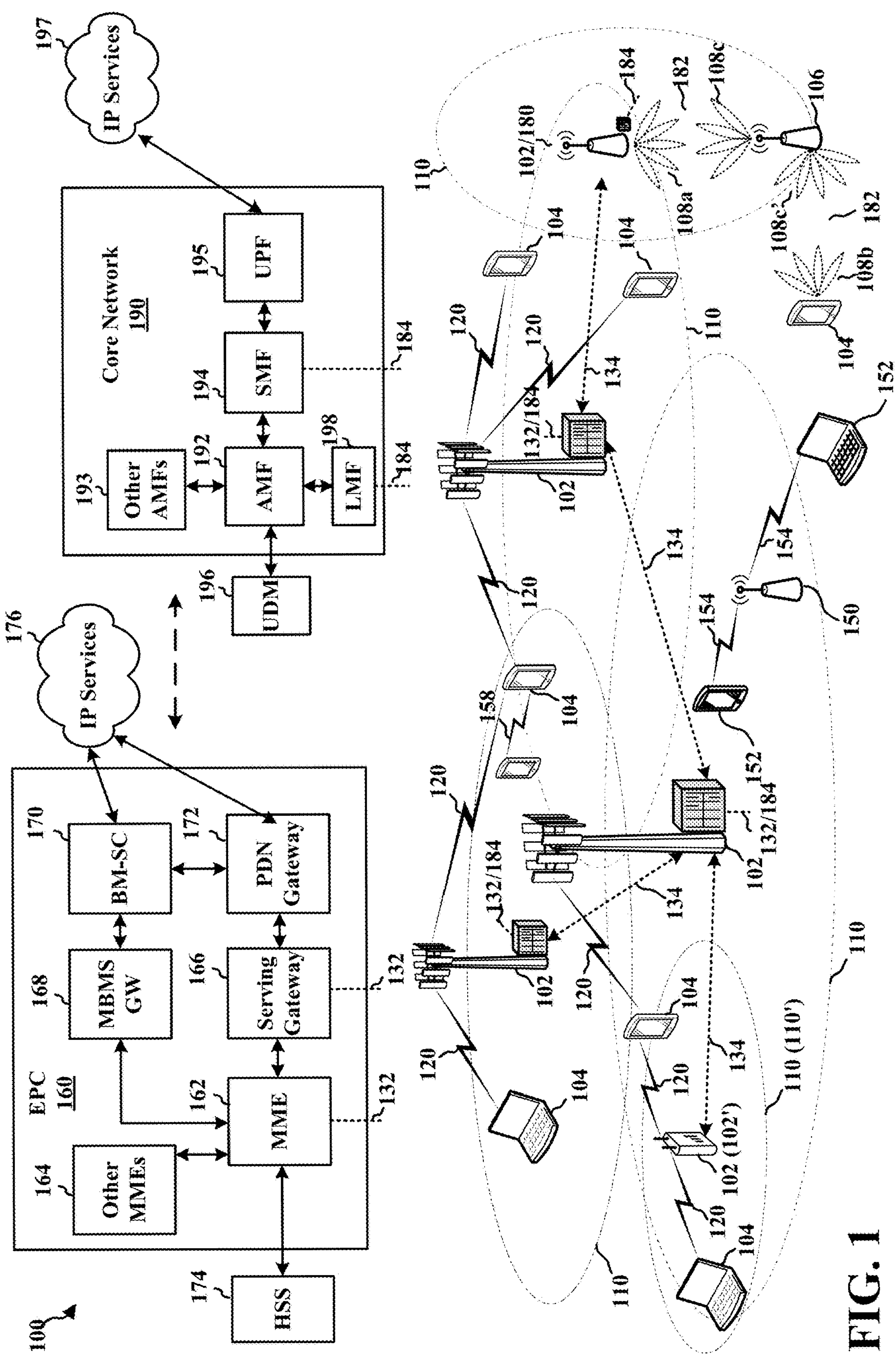
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR. The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available. The small cell 102' may operate in a licensed and/or an unlicensed frequency spectrum. When operating in an unlicensed frequency spectrum, the small cell 102" may employ NR and use the same 5 GHZ unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHZ with a wavelength of 100 millimeters. The super high frequency (SHF) band extends between 3 GHZ and 30 GHZ, also referred to as centimeter wave. Communications using the mmW/near mmW radio frequency band (e.g., 3 GHZ-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108*a*. The UE 104 may receive the beamformed signal from the base station 180 in one or more receive directions 108*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
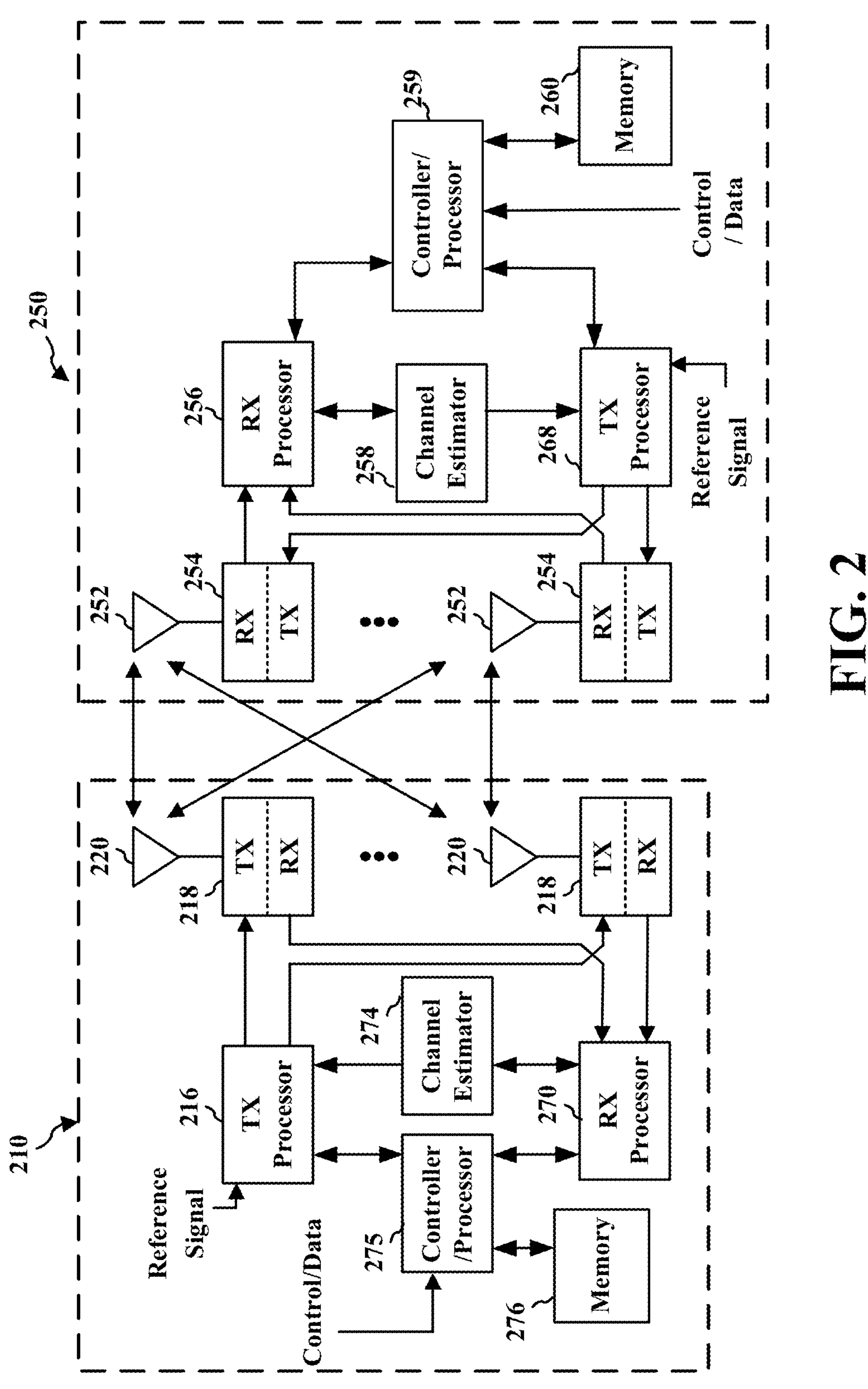
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting: PDCP layer functionality associated with header compression/decompression, security (ciphering, deciphering, integrity protection, integrity verification), and handover support functions: RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs: and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization. The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting: PDCP layer functionality associated with header compression/decompression, and security (ciphering, deciphering, integrity protection, integrity verification): RLC layer functionality associated with the transfer of upper layer PDUs, error correction through ARQ, concatenation, segmentation, and reassembly of RLC SDUs, re-segmentation of RLC data PDUs, and reordering of RLC data PDUs: and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHZ), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
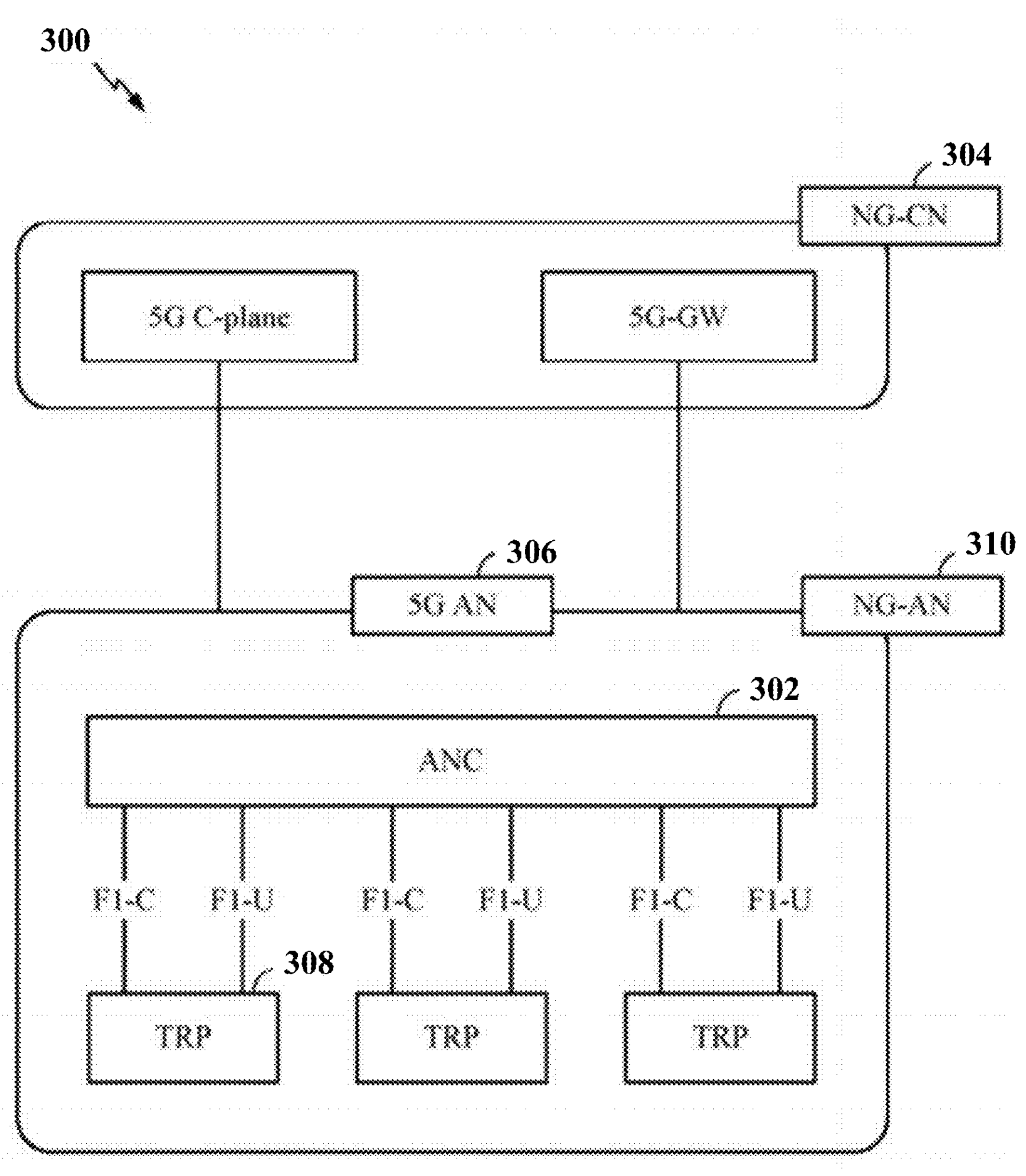
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310) may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
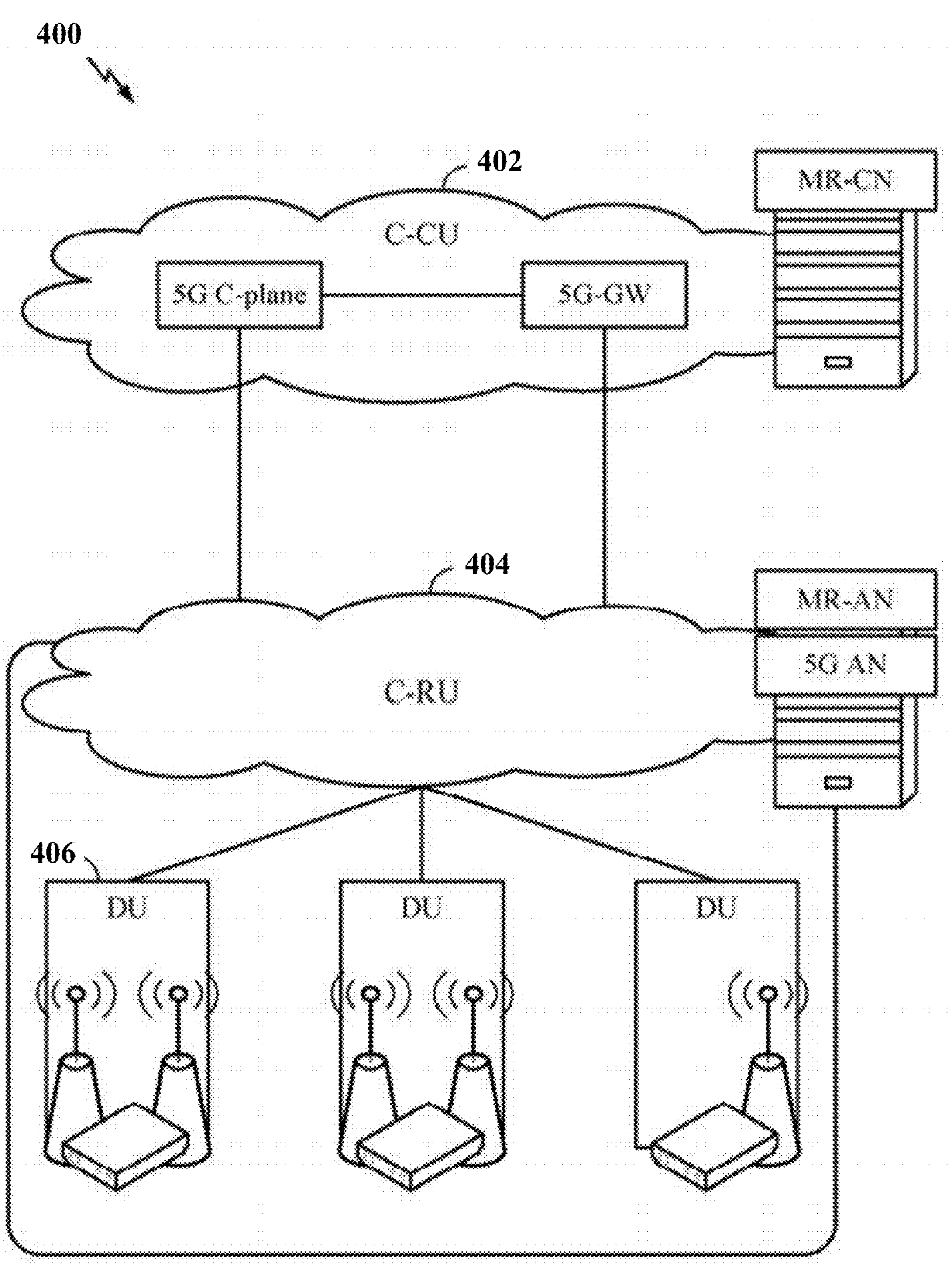
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
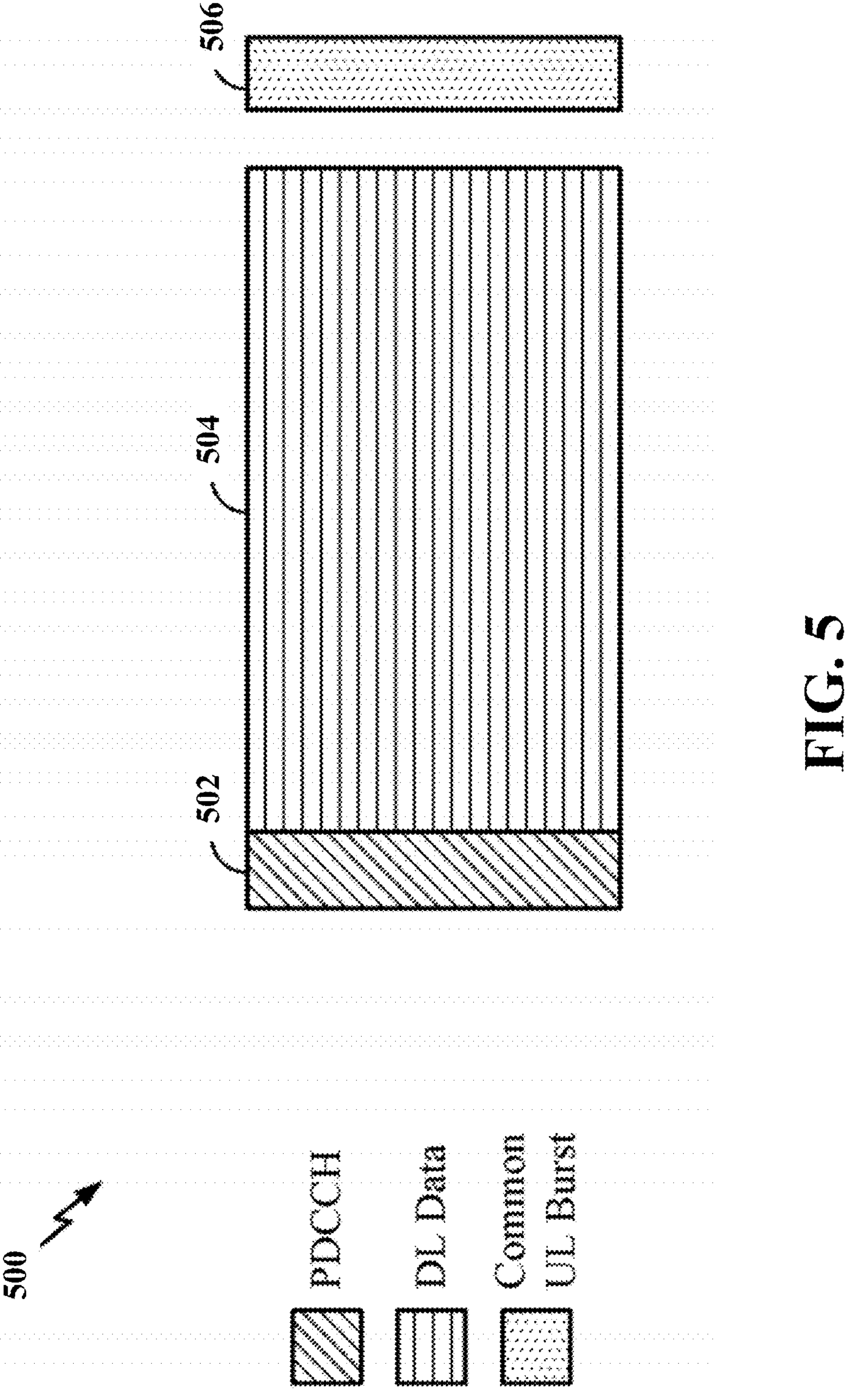
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
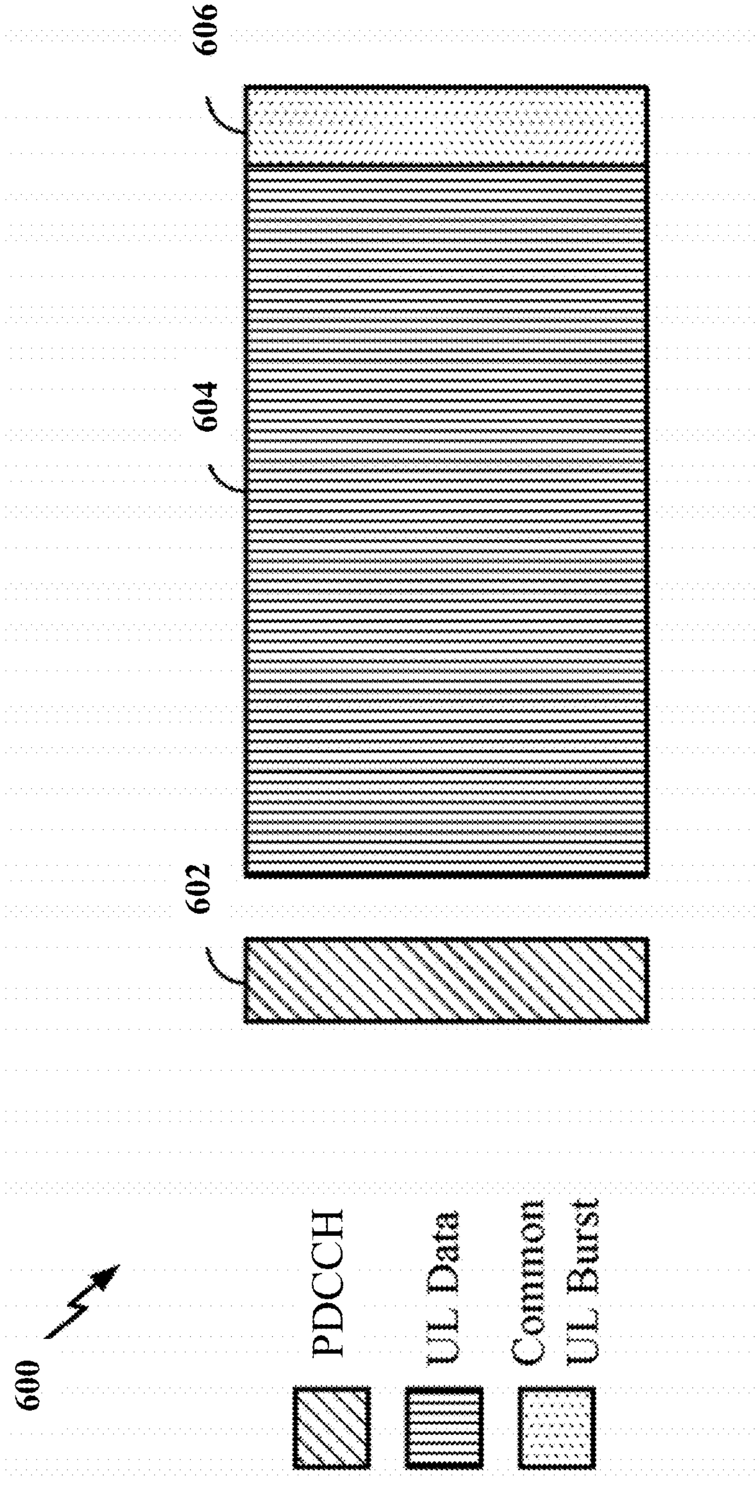
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
FIG. 7 is a diagram illustrating a contention-based random access procedure.
Figure 7:
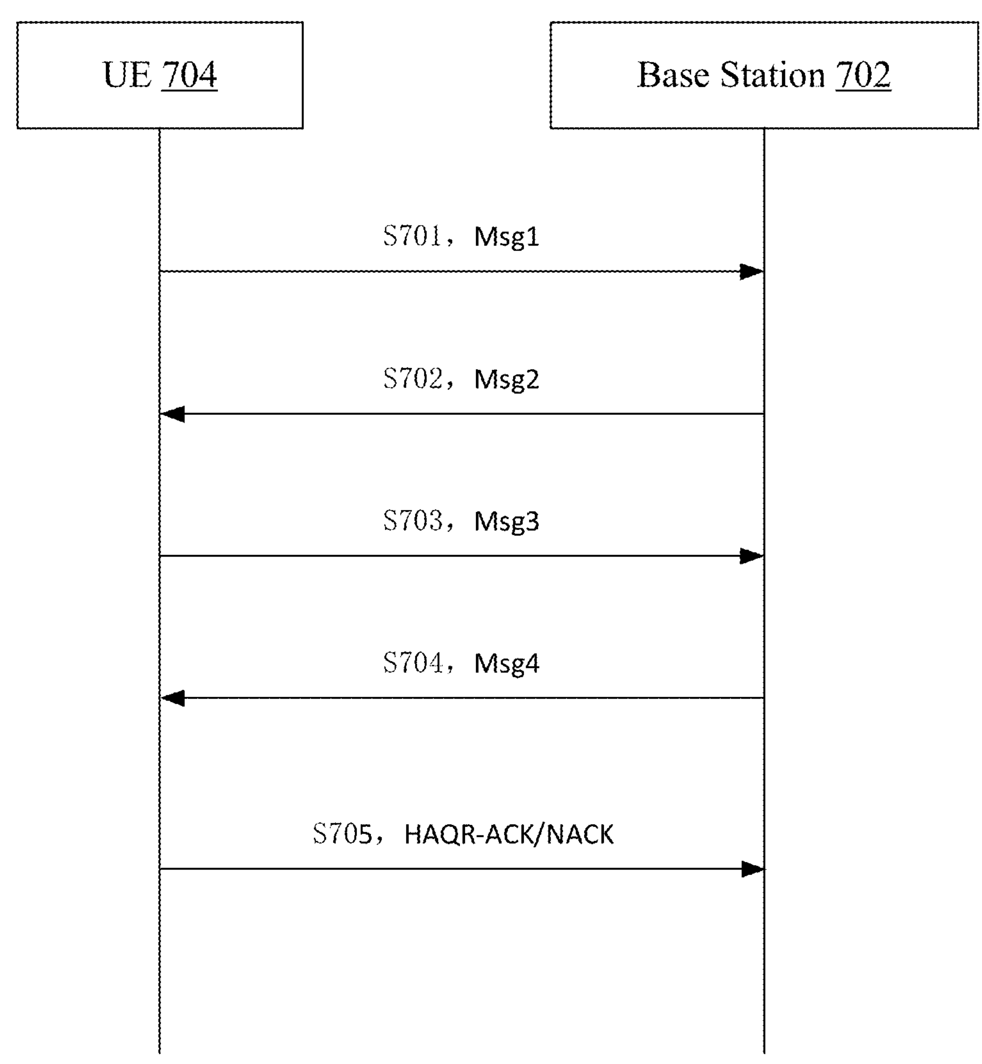

FIG. 7 is a diagram 700 illustrating a contention-based random access procedure. The random access procedure is the process of establishing a radio link connection between a UE and a base station. In this example, at step S701, the UE 704 sends a Message 1 (Msg1), which is a preamble, to the base station 702 through a Physical Random Access Channel (PRACH). The Message 1 is used to notify the base station 702 that there is a random access request.

At step S702, after detecting the Message 1, the base station 702 responds to the UE 704 by sending a Message 2 (Msg2). The Message 2 is a Random Access Response (RAR), which contains scheduling information, e.g., uplink (UL) grant information, for a Physical Uplink Shared Channel (PUSCH) that carries a Message 3 (described infra). The Message 2 may also contain Timing Alignment information for synchronization, Temporary C-RNTI (TC-RNTI), and RA preamble identifier.

At step S703, the UE 704 sends the Message 3 (Msg3) to the base station 702 based on the scheduling information carried in the Message 2. The Message 3 may contain UE Identity (ID). This is the identity of the UE 704, which allows the base station 702 to distinguish between different UEs. The UE ID could be a temporary ID such as the TC-RNTI or C-RNTI. The Message 3 may contain Establishment Cause, which indicates the reason for the UE initiating the random access procedure, such as initial access, handover, scheduling request, etc. The Message may contain a Radio Resource Control (RRC) Connection Request. This message is included if the random access is initiated for an RRC connection establishment. It includes parameters needed for the RRC connection setup. In other words, the Message 3 carries the UE identity, establishment cause, and other control/data information needed to establish the RRC connection and assist with uplink scheduling. The exact contents depend on the random access procedure trigger and RRC state. Message 3 provides the base station with key information prior to contention resolution.

At step S704, after the base station 702 receives Message 3 from the UE 704, the base station 702 sends a Message 4 (Msg4), which is a Contention Resolution message. The Message 4 is transmitted on the PDSCH and addressed to the C-RNTI of the UE 704. The purpose is to confirm that the base station 702 has received Message 3 and successfully identified the UE 704. This resolves any potential collisions/contention. It echoes back the UE Identity sent in the Message 3 to confirm the UE 704 was successfully identified.

At step S705, the UE send a HARQ acknowledgment/negative acknowledgment (HARQ-ACK/NACK) to confirm successful/unsuccessful reception of the Message 4. This HARQ-ACK/NACK information is transmitted on the Physical Uplink Control Channel (PUCCH). The resources used on PUCCH for the HARQ-ACK/NACK may be indicated to the UE in the downlink control information (DCI) that scheduled Message 4 with CRC scrambled by TC-RNTI. The HARQ-ACK acts as a normal acknowledgement for a PDSCH transmission. However, in some scenarios (e.g., NR NTN with large coverage requirements), a single HARQ-ACK transmission repetition may not be reliable enough.

To meet the coverage requirements in such scenarios, PUCCH repetition may be used for HARQ-ACK/NACK for Message 4 to improve the reliability. With repetition, the UE can transmit the HARQ-ACK/NACK multiple times, which increases the probability that the network successfully receives it.

The network needs to be able to indicate the repetition factor, for example through a common configuration or a combination of a common configuration and/or a UE-specific configuration, to the UE dynamically based on the channel conditions and coverage requirements. This allows the network to control how many repetitions the UE does, for balancing reliability and overhead as needed.

Figure 8:
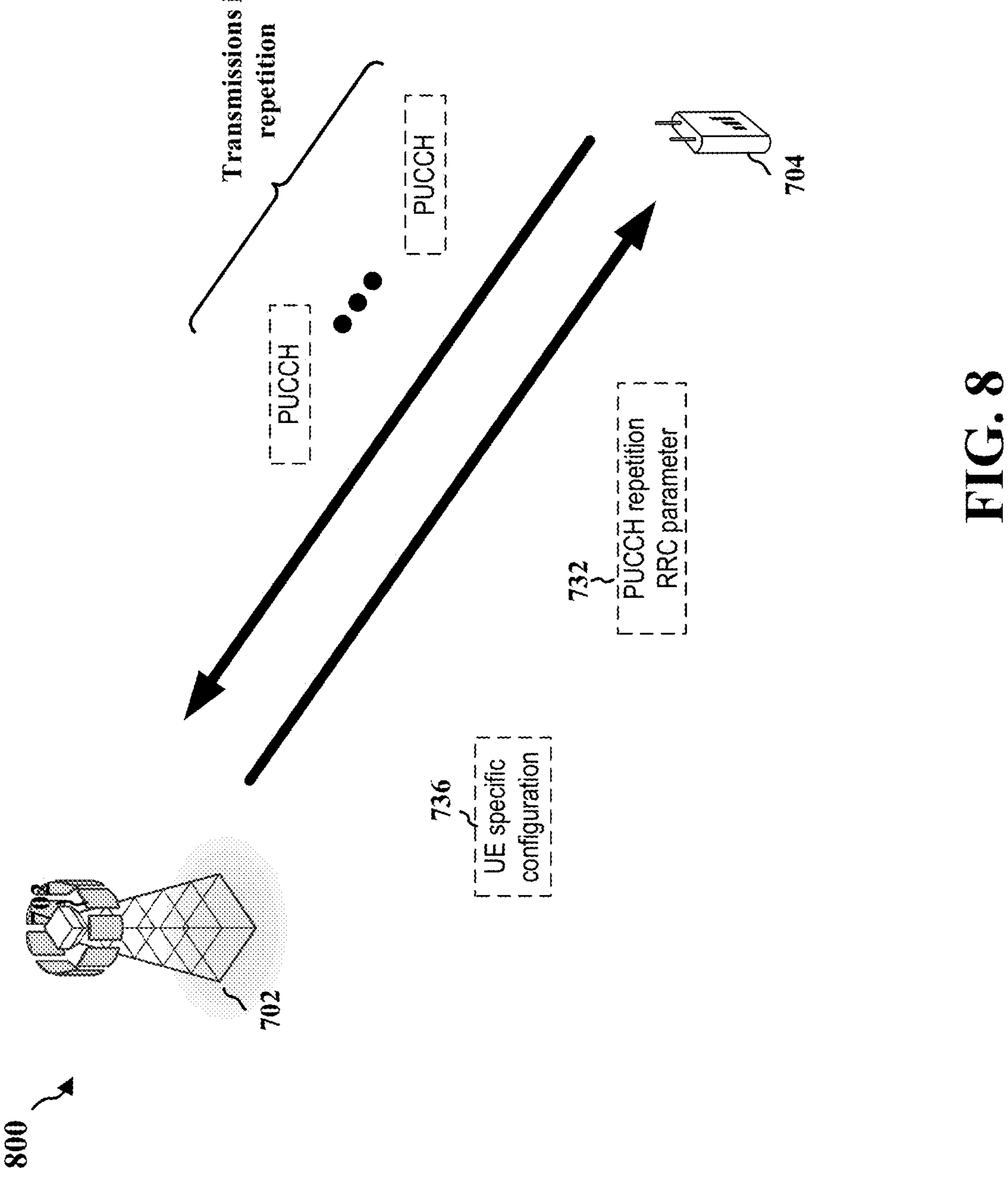
FIG. 8 is a diagram illustrating that a base station configures a number of PUCCH repetition for a UE.

FIG. 8 is a diagram 800 illustrating that a base station configures the number of PUCCH repetition for a UE. In this example, the base station 702 send a PUCCH repetition RRC parameter 732 to the UE 704. For example, the PUCCH repetition RRC parameter 732 may be pucch-AggregationFactor. The PUCCH repetition RRC parameter 732 indicates one or more repetition patterns for PUCCH transmissions. The PUCCH repetition RRC parameter 732 can be used to configure the repetition factor specifically for Message 4 HARQ-ACK/NACK PUCCH. The PUCCH repetition RRC parameter 732 can also apply to other PUCCH transmissions using the common PUCCH configuration, or apply to the other PUCCH when a specific PUCCH resource configuration is not provided.

In certain configurations, the PUCCH repetition RRC parameter 732 may be added to PUCCH-ConfigCommon information element (IE), which is carried in the System Information Block (SIB) broadcast from the base station 702. The UE 704 and other UEs detects the SIB and determines the PUCCH repetition RRC parameter 732.

The PUCCH repetition RRC parameter 732 indicates a set of candidate repetition factors for PUCCH transmissions. The set of candidate repetition factors may be, for example, {2}, {4}, {8}, {1, 2}, {1, 4}, {1, 8}, {1, 2, 4}, {1, 2, 8}, {1, 4, 8}, {1, 2, 4, 8}, {2, 4}, {2, 8}, {2, 4, 8}, or {4, 8}, etc. For example, the set of candidate repetition factors {2} indicates the repetition factor for PUCCH transmission of the PUCCH HARQ-ACK/NACK for Msg4 is 2 for all receiving UEs (e.g., the UE 704). The set of candidate repetition factors {1, 2, 4} indicates the repetition factor for PUCCH transmission of the PUCCH HARQ-ACK/NACK for Msg4 may be 1, 2 or 4 for all receiving UEs.

The PUCCH-ConfigCommon information element contains configuration parameters for the common resources and repetition factors used for PUCCH transmissions. By including the PUCCH repetition RRC parameter 732 in this information element, in certain configurations, the base station can indicate candidate repetition factors that apply not only to the PUCCH transmission containing the HARQ ACK/NACK for the contention resolution message (Msg4), but also to other PUCCH transmissions using the common PUCCH configuration, or apply to the other PUCCH when a specific PUCCH resource configuration is not provided.

For example, the PUCCH repetition RRC parameter 732 may configure a set of candidate repetition factors such as {2, 4, 8}. Other PUCCH transmissions by the UE that use the common PUCCH configuration can also be repeated with a factor selected from the set of candidate repetition factors such as {2, 4, 8}.

When the PUCCH repetition RRC parameter 732 (e.g., the pucch-AggregationFactor) does not exist in the PUCCH-ConfigCommon information element, the UE 704 may determine that the default repetition factor is 1. Therefore, the base station 702 may not need to configure the PUCCH repetition RRC parameter 732 to indicate {1}.

Subsequently, the base station 702 may select a particular repetition factor from the set of candidate repetition factors or a set of default candidate repetition factors indicated in the PUCCH repetition RRC parameter 732 for the UE 704 (or other particular UEs using the common PUCCH configuration) to use. In certain configurations, the UE 704 may determine a particular repetition factor from the set of candidate repetition factors or the set of default candidate repetition factors based on certain rules without additional signaling from the base station 702. In certain configurations, the base station 702 sends a UE specific configuration 736 to the UE 704 to indicate the particular repetition factor that the UE 704 uses when transmitting PUCCH HARQ-ACK/NACK for Msg4 or other PUCCH transmissions by the UE that use the common PUCCH configuration. In certain configurations, the set of candidate repetition factors is the common configuration received from the base station, and the set of default candidate repetition factors is predefined configuration.

In a first technique, the UE specific configuration 736 is carried in the PDCCH scheduling the RAR of the procedure described referring to FIG. 7. For example, a new DCI field, e.g., pucch-AggregationFactor, may be added in the DCI format 1_0 with CRC scrambled by RA-RNTI or MsgB-RNTI to carry the UE specific configuration 736. The pucch-AggregationFactor may be 1 or 2 bits.

The reserved bits (14-A) in DCI format 1_0 are used for operation in a cell without shared spectrum access, and the reserved bits (16-A) are used for operation in a cell with shared spectrum access. A is the number of bits for the field of the least significant bit (LSB) of the system frame number (SFN).

In certain configurations, the values of the pucch-AggregationFactor field (i.e., the UE specific configuration 736) are 00 to 11. In one example, the set of candidate repetition factors or the set of default candidate repetition factors for PUCCH transmissions is {1, 2, 4, 8}. The values of the pucch-AggregationFactor field and the corresponding repetition factors are shown in Table 1. '00' indicates the first number in the set of candidate repetition factors (i.e., 1), '01' indicates the second number in the set of candidate repetition factors (i.e., 2), and so on.

TABLE 1

| pucch-AggregationFactor | Repetition factor for PUCCH for Msg4 |
|---|---|
| 00 | 1 |
| 01 | 2 |
| 10 | 4 |
| 11 | 8 |

Figure 9:
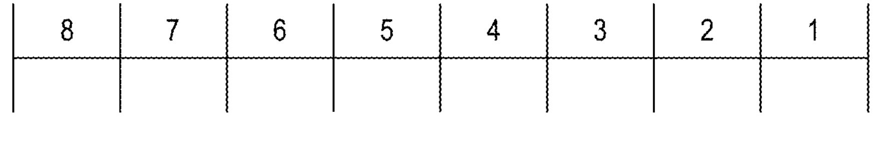
FIG. 9 is a diagram illustrating a medium access control (MAC) payload for a Random Access Response (RAR).

FIG. 9 is a diagram 900 illustrating a MAC payload for a Random Access Response (RAR). In a second technique, the UE specific configuration 736 may be carried in the MAC payload for the RAR. For example, a new field such as pucch-AggregationFactor can be added in the MAC payload to carry the UE specific configuration 736. In certain configurations, the size of the pucch-AggregationFactor field is 1 bit. The MAC payload includes a R field, which includes reserved bits typically set to 0. The MAC payload includes a Timing Advance Command field, which indicates the index value TA used to control the amount of timing adjustment that the MAC entity has to apply. The size of the Timing Advance Command field is 12 bits. The MAC payload includes a UL Grant field, which indicates the resources to be used on the uplink. The size of the UL Grant field is 27 bits. The MAC payload includes a Temporary C-RNTI field, which indicates the temporary identity used by the MAC entity during the Random Access procedure.

The size of the Temporary C-RNTI field is 16 bits. The R field may be replaced with a pucch-AggregationFactor field, which indicate the mumber of repetitions for PUCCH. The size of the pucch-AggregationFactor field is 1 bit.

In certain configurations, the values of the pucch-AggregationFactor field (i.e., the UE specific configuration 736) are 0 and 1. In one example, the set of candidate repetition factors or the set of default candidate repetition factors for PUCCH transmissions is {2, 4}. The values of the pucch-AggregationFactor field and the corresponding repetition factors are shown in Table 2. '0' indicates the first number in the set of candidate repetition factors (i.e., 2), and '1' indicates the second number in the set of candidate repetition factors (i.e., 4).

TABLE 2

| pucch-AggregationFactor | Repetition factor for PUCCH for Msg4 |
|---|---|
| 0 | 2 |
| 1 | 4 |

In a third technique, the UE specific configuration 736 may be carried in PDCCH scheduling Msg4. In particular, a new or a re-interpreted DCI field in the DCI format 1_0 with CRC scrambled by TC-RNTI may be used to carry the UE specific configuration 736. In a first approach of the third technique, the 1 or 2 bits of the Downlink Assignment Index (DAI) field in DCI format 1_0 are reinterpreted to indicate the repetition factor for PUCCH transmission of the HARQ-ACK/NACK for Msg4.

In certain configurations, the values of the DAI field (i.e., the UE specific configuration 736) are 00 to 11. For example, 1 or 2 bits of the DAI field can be reinterpreted to carry the PUCCH repetition factor for Msg4 instead of their original purpose according to mapping rules or mapping equations. The mapping rule maps a value of the DAI field to a corresponding number of the set of candidate repetition factors or the set of default candidate repetition factors. For example, if the DAI field is 2 bits, it can indicate a repetition factor of 1, 2, 4, or 8 based on the bit values 00, 01, 10 and 11 respectively. If the DAI field is 1 bit, it can indicate a repetition factor of 2 or 4 based on the bit values 0 and 1 respectively. The mapping rule may also involve a simple equation like $N=2^{DAI\_value}$. Alternatively, default values or the set of default candidate repetition factors can be used. For example, if the DAI field is not present or the UE does not support this feature, the default repetition factor is 1. For example, if the set of candidate repetition factors does not exist in the PUCCH repetition RRC parameter 732, the set of default candidate repetition factors may be used, for example, if the DAI field is 2 bits, it may indicate a repetition factor of 1, 2, 4, or 8 based on the bit values 00, 01, 10 and 11 respectively.

In certain configurations, when multiple candidate repetition factors (e.g. 2, 4, 8) are configured for the UE through higher layer signaling, the DAI field can be reinterpreted to signal which the repetition factor the UE should use. Specifically, the DAI field is 2 bits and has 4 possible bit combinations: 00, 01, 10, 11. Thus, the DAI field can represent 4 different states. These 4 states can be mapped to the 1st, 2nd, 3rd and 4th configured repetition factors.

For example, if the configured candidate repetition factors are {2, 4, 8}, then '00' maps to the 1st configured factor 2, '01' maps to the 2nd configured factor 4, and '10' maps to the 3rd configured factor 8. The 'Il' codepoint is not used since there are only 3 configured factors.

Similarly, if the configured factors are {2, 4}, then '00' maps to 2 and '01' maps to 4. The codepoints '10' and '11' are not used since there are only 2 configured factors.

As such, the 2 bits of DAI field are used to select among the configured candidate repetition factors for the PUCCH transmission containing the HARQ ACK/NACK for Msg4. The number of usable codepoints depends on how many candidate factors are configured through higher layer signaling. Any excessive codepoints are not used if there are fewer configured factors than the number of possible codepoint states.

In one example, the set of candidate repetition factors for PUCCH transmissions is {1, 2, 4, 8}. The values of the DAI field and the corresponding repetition factors are shown in Table 3. '00' indicates the first number in the set of candidate repetition factors (i.e., 1), '01' indicates the second number in the set of candidate repetition factors (i.e., 2), and so on.

TABLE 3

| DAI | Repetition factor for PUCCH for Msg4 |
|---|---|
| 00 | 1 |
| 01 | 2 |
| 10 | 4 |
| 11 | 8 |

In certain configurations, the values of the DAI field (i.e., the UE specific configuration 736) are 0 and 1. In one example, the set of candidate repetition factors for PUCCH transmissions is {2, 4}. The values of the DAI field and the corresponding repetition factors are shown in Table 4. '0' indicates the first number in the set of candidate repetition factors (i.e., 2), and 'l' indicates the second number in the set of candidate repetition factors (i.e., 4).

TABLE 4

| DAI | Repetition factor for PUCCH for Msg4 |
|---|---|
| 0 | 2 |
| 1 | 4 |

In a second approach of the third technique, the 4 bits of the HARQ processes number field in DCI format 1_0 are reinterpreted to indicate the repetition factor for PUCCH transmission of the HARQ-ACK for Msg4. In certain configurations, two bits (e.g., the two leftmost bits) of the HARQ processes number field are used to indicate carry the UE specific configuration 736.

In one example, the set of candidate repetition factors or the set of default candidate repetition factors for PUCCH transmissions is {1, 2, 4, 8}. As shown in Table 5, When the value range of the "HARQ processes number" field includes 0000 to 0011, 0100 to 0111, 1000 to 1011 and 1100 to 1111, it indicates the repetition factor for PUCCH transmissions is 1, 2, 4 and 8, respectively.

TABLE 5

| HARQ process number | Repetition factor for PUCCH for Msg4 |
|---|---|
| 0000~0011 | 1 |
| 0100~0111 | 2 |
| 1000~1011 | 4 |
| 1100~1111 | 8 |

As described supra, for PUCCH repetition for Msg4 HARQ-ACK, the base station 702 can configure a cell-specific repetition factor (e.g., the PUCCH repetition RRC parameter 732) via the System Information Block (SIB). The UE 704 may report its repetition capability using Msg1 or Msg3. If the UE 704 does not report the repetition capability using Msg1 or Msg3, it means that the UE 704 is incapable of the configured repetition factors. Further, after receiving a report that the UE 704 has the repetition capability, the base station 702 can dynamically indicate a UE-specific repetition factor (e.g., the UE specific configuration 736) by using Msg2/Msg4 or DCI scheduling Msg4.

For example, in the System Information Block (SIB), the "PUCCH-ConfigCommon information element" can indicate a 'repetition factor', which specifies the number of repetitions for PUCCH HARQ-ACK for Msg4 transmissions and/or the number of repetitions for other PUCCH transmissions using the PUCCH-ConfigCommon information element. Therefore, SIB can be used to configure one or more parameters to indicate the number of repetitions.

A set of candidate repetition factors including one or more repetition factors can be carried by the PUCCH repetition RRC parameter 732 in the SIB. The set of candidate repetition factors may be, for example, {2}, {4}, {8}, {1, 2}, {1, 4}, {1, 8}, {1, 2, 4}, {1, 2, 8}, {1, 4, 8}, {1, 2, 4, 8}, {2, 4}, {2, 8}, {2, 4, 8}, or {4, 8}, etc.

Figure 10:
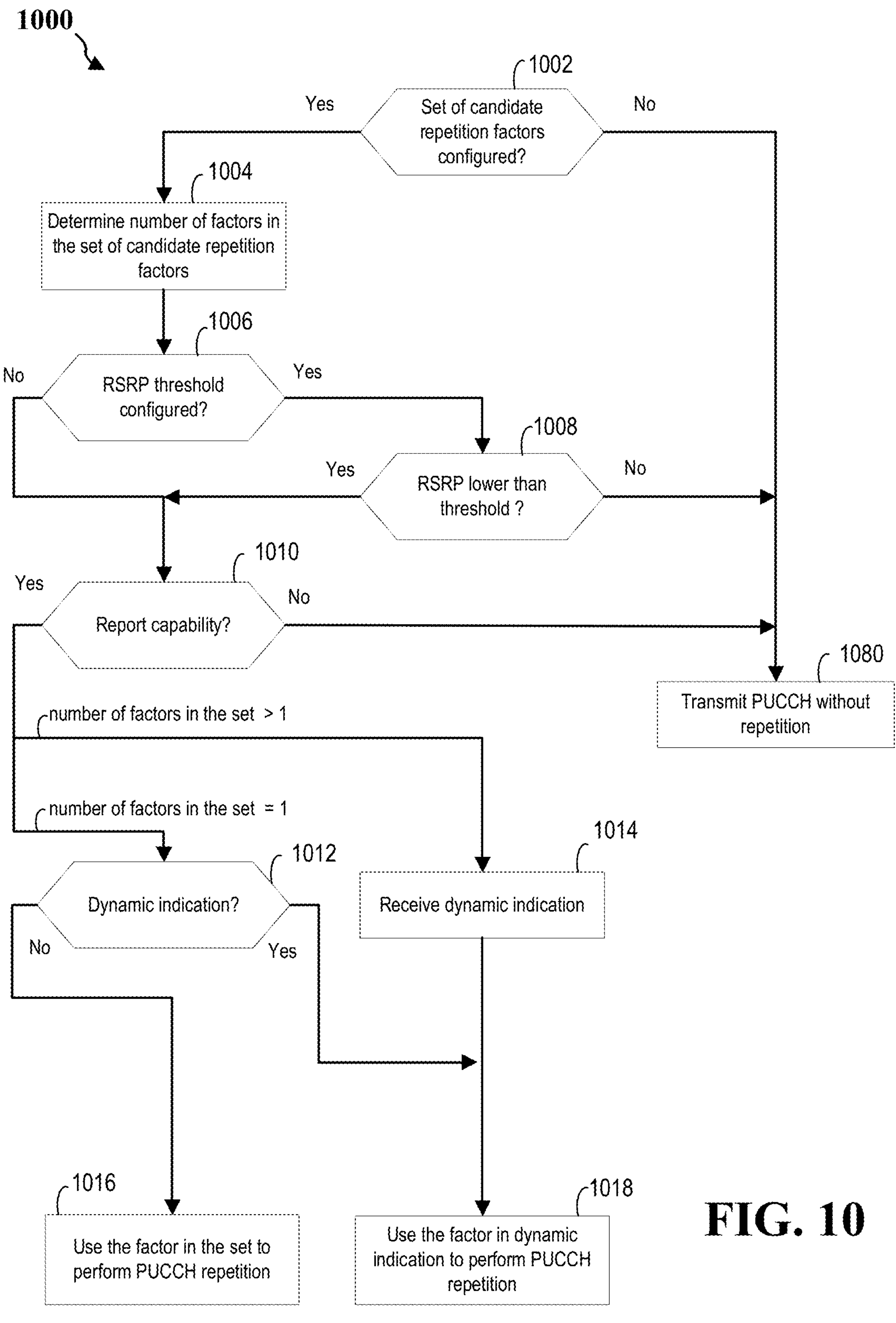
FIG. 10 is a flow chart illustrating a procedure for transmitting PUCCH in repetition.

FIG. 10 is a flow chart 1000 illustrating a procedure for transmitting PUCCH in repetition. In operation 1002, the UE 704 determines if a set of candidate repetition factors is configured in the SIB information element. If not configured, the UE 704 proceeds to operation 1080; otherwise, the UE 704 proceeds to operation 1004.

In operation 1004, the UE 704 determines the number of repetition factors in the set of candidate repetition factors is one or more than one.

Subsequently, the UE 704 proceeds to operation 1006. In a first configuration, the UE 704 proceeds operation 1008. Alternatively, in a second configuration, the UE 704 proceeds directly to operation 1010 after operation 1006 without entering operation 1008.

In operation 1006, the UE 704 further determines if a RSRP threshold is also configured in the SIB. The RSRP threshold is used to determine whether the UE 704 should report its capability of PUCCH repetition for Msg4 HARQ-ACK to the network. If an RSRP threshold is configured by the network via SIB, the UE will compare its measured RSRP to this threshold. If the measured RSRP is lower than the configured threshold, it implies the UE is in a coverage limited scenario. In this case, the UE will report its capability of PUCCH repetition for Msg4 HARQ-ACK to the network. If the measured RSRP is not lower than the threshold, the UE will not report the capability. If no RSRP threshold is configured by the network via SIB, the UE will by default report its capability regardless of the measured RSRP. PUCCH repetition is beneficial in coverage limited scenarios to improve reliability. By using the RSRP threshold, the network can control whether the UE reports the repetition capability based on the channel conditions. If the capability is reported, the network can choose to configure PUCCH repetition for Msg4 HARQ-ACK dynamically for that UE. If the capability is not reported, repetition may not be used.

If an RSRP threshold is configured, in operation 1008, the UE 704 measures an RSRP of a downlink reference signal such as an SSB and determines if the measured RSRP is lower than the RSRP threshold. If the measured RSRP is not lower than the RSRP threshold, the UE 704 proceeds to operation 1080.

If the measured RSRP is lower than the RSRP threshold, the UE 704 proceeds to operation 1010. If no RSRP threshold is configured, the UE 704 proceeds to operation 1010.

In operation 1010, the UE 704 reports its repetition capability using Msg1 or Msg3 to indicate whether the UE 704 has the capability to perform PUCCH repetition. If the UE 704 does not report a capability, it implies that the UE 704 does not have the capability.

In one example, in Msg3 transmission, the RRC message includes a field, for example, "pucch-AggregationCapability-r18" to indicate whether the UE 704 supports PUCCH repetition for Msg4 HARQ-ACK or not. The Msg3 RRC message can be RRCSetupRequest, RRCResumeRequest, RRCReestablishmentRequest, etc. based on the trigger for the random access procedure.

The "pucch-AggregationCapability-r18" field is an optional field taking values of two states such as true/false. If the value is the first state (e.g., true), the UE 704 has capability to do repetition for Msg4 HARQ-ACK PUCCH. If the value is the second state (e.g., false), the UE 704 does not have capability to do repetition for Msg4 HARQ-ACK PUCCH. Further, the absence of field indicates that the UE does not have capability for PUCCH repetition. As such, the optional field "pucch-AggregationCapability-r18" in the Msg3 RRC message is used by the UE 704 to explicitly signal to the base station 702 whether it can support PUCCH repetition for Msg4 HARQ-ACK or not. Based on this capability report, the base station 702 can determine whether to configure PUCCH repetition for the UE.

If the UE 704 does not have the repetition capability, the UE 704 proceeds to operation 1080. If the UE 704 has repetition capability and the number of repetition factors in the set of candidate repetition factors determined in operation 1004 is 1, the UE 704 proceeds to operation 1012.

In operation 1012, the UE 704 determines if a repetition factor is dynamically indicated in Msg2, Msg4, or DCI scheduling Msg4. In particular, as described supra, the repetition factor for PUCCH transmission of Msg4 HARQ-ACK feedback can be indicated dynamically using the DAI field in the DCI scheduling Msg4. The DCI format 1_0 is used that schedules the PDSCH carrying Msg4, with CRC scrambled by the TC-RNTI allocated to the UE. The DAI field in this DCI is then repurposed to indicate the PUCCH repetition factor that the UE should use for transmitting Msg4 HARQ-ACK. The DAI field bits can be mapped to candidate repetition factor values based on the configured candidates.

If a repetition factor is not dynamically indicated, in operation 1016, the UE 704 uses the one repetition factor included in the set of candidate repetition factors to perform the repetition. If a repetition factor is dynamically indicated and the UE 704 proceeds to operation 1014 to receive dynamic indication, the UE 704 then proceeds to operation 1018. In operation 1018, the UE uses the indicated repetition factor to perform the repetition.

If the UE 704 has repetition capability and the number of repetition factors in the set of candidate repetition factors determined in operation 1004 is greater than 1, in operation 1014, the UE detects a repetition factor dynamically indicated in Msg2, Msg4, or DCI scheduling Msg 4. Then, the UE 704 proceeds to operation 1018, which is described supra.

When the UE 704 enters operation 1080, the UE 704 transmits PUCCH for Msg4 once without repetition.

In another aspect, the PUCCH-ConfigCommon information element (IE) in the SIB may include a field pucch-FH-r18 to provide more configuration flexibility for frequency hopping for PUCCH carrying Msg4 HARQ feedback and for other PUCCH transmissions using the PUCCH-ConfigCommon information element, especially when PUCCH repetition is used.

If the pucch-FH-r18 field itself is absent in the PUCCH-ConfigCommon IE, the UE 704 accordingly does not use frequency hopping for PUCCH transmissions. The PUCCH will stay on the same frequency resource across all repetitions.

If pucch-FH-r18 is present in the IE and is set to "intra-slot", it enables intra-slot frequency hopping for PUCCH. This means the PUCCH will hop to a different frequency resource within the same slot for each repetition. If pucch-FH-r18 is present and is set to "inter-slot", it enables inter-slot frequency hopping for PUCCH. This means the PUCCH repeats on different frequency resources across slots.

FIG. 11 is a diagram 1100 illustrating techniques of determine whether Msg3 repetition and Msg4 HARQ-ACK repetition are applicable for a random access procedure. The base station 702 may have configured RA resources 1110. Further, the RA resources 1110 are divided into multiple sets, including set(s) of RA resources 1114 indicating Msg3 repetition and set(s) of RA resources 1118 indicating Msg4 HARQ-ACK repetition. Further, the set(s) of RA resources 1114 indicating Msg3 repetition and the set(s) of RA resources 1118 indicating Msg4 HARQ-ACK repetition have a subset 1122 of RA resources indicating both Msg3 repetition and Msg4 HARQ-ACK repetition.

In a first operation, the UE 704 determines whether a BWP selected for a random access procedure (e.g., the RA procedure in FIG. 7) is configured with the set(s) of RA resources 1122 indicating Msg3 repetition and Msg4 HARQ-ACK repetition as well as other set(s) of random access resources without indicating Msg3 repetition or Msg4 HARQ-ACK repetition. The UE 704 also determines whether the RSRP of a downlink pathloss reference signal is less than thresholds rsrp-ThresholdMsg3 and rsrp-ThresholdMsg4HARQ-ACK. Thresholds rsrp-ThresholdMsg3 and rsrp-ThresholdMsg4HARQ-ACK can be configured in SIB.

Alternatively, in the first operation, the UE 704 determines whether only the set(s) of RA resources 1122 indicating Msg3 repetition and indicating Msg4 HARQ-ACK repetition are configured for the BWP selected for the random access procedure.

If one of the above conditions of the first operation is true, the base station 702 and/or the UE 704 assume both Msg3 repetition and Msg4 HARQ-ACK repetition are applicable for the current random access procedure.

If none of the conditions of the first operation is true, in a second operation, the UE 704 determines whether the BWP selected for the random access procedure is configured with the set(s) of RA resources 1114 indicating Msg3 repetition and other set(s) of random access resources without indicating Msg3 repetition. The UE 704 further determines if the RSRP of the downlink pathloss reference signal is less than threshold rsrp-ThresholdMsg3. Threshold rsrp-ThresholdMsg3 can be configured in SIB.

Alternatively, in the second operation, the UE 704 determines whether only the set(s) of RA resources 1114 indicating Msg3 repetition are configured for the BWP selected for the random access procedure.

If one of the above conditions of the second operation is true, the base station 702 and/or the UE 704 assume Msg3 repetition is applicable for the current random access procedure.

If none of the conditions of the first operation and the second operation is true, in a third operation, the UE 704 determines whether the BWP selected for the random access procedure is configured with the set(s) of RA resources 1118 indicating Msg4 HARQ-ACK repetition and other set(s) of random access resources without indicating Msg4 HARQ-ACK repetition. Further, the UE 704 determines whether the RSRP of the downlink pathloss reference signal is less than threshold rsrp-ThresholdMsg4HARQ-ACK. Threshold rsrp-ThresholdMsg4HARQ-ACK can be configured in SIB Alternatively, in the third operation, the UE 704 determines that only the set(s) of RA resources 1118 indicating Msg4 HARQ-ACK repetition are configured for the BWP selected for the random access procedure.

If one of the above conditions of the third operation is true, the base station 702 and/or the UE 704 assume Msg4 HARQ-ACK repetition is applicable for the current random access procedure.

If none of the above conditions of the first operation, the second operation, and the third operation is true, the base station 702 and/or the UE 704 assume that neither Msg3 repetition nor Msg4 HARQ-ACK repetition is applicable for the current random access procedure.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary." is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:

receiving, from a base station, a system information block (SIB);

determining whether the SIB includes a set of candidate repetition factors for physical uplink control channel (PUCCH) transmissions;

in response to determining that the SIB includes the set of candidate repetition factors:

determining whether a reference signal received power (RSRP) threshold is included in the SIB;

measuring an RSRP of a downlink reference signal; and determining whether the measured RSRP is lower than the RSRP threshold when the RSRP threshold is configured in the SIB;

transmitting, to the base station in a message of a random access procedure, an indication of a capability of the UE for PUCCH repetition, wherein the indication of the capability is transmitted further in response to a determination that the measured RSRP is lower than the RSRP threshold;

when the UE has the capability:

determining a particular repetition factor based on at least one of the set of candidate repetition factors and a dynamic indication of a repetition factor; and transmitting an acknowledgement (ACK) or negative acknowledgement (NACK) of a message 4 of the random access procedure in a PUCCH in accordance with the particular repetition factor.

2. The method of claim 1, further comprising:

in response to determining that the SIB includes the set of candidate repetition factors and that the measured RSRP is not lower than the RSRP threshold, transmitting the ACK or the NACK of the message 4 in the PUCCH without repetition; and in response to determining that the SIB does not include the set of candidate repetition factors, transmitting the ACK or the NACK of the message 4 in the PUCCH without repetition.

3. The method of claim 1, further comprising:

receiving, from the base station, the dynamic indication of the repetition factor in at least one of a message 2 of the random access procedure, the message 4, or downlink control information (DCI) scheduling the message 4.

4. The method of claim 1, wherein the indication of the capability is transmitted in a message 1 or a message 3 of the random access procedure.

5. The method of claim 4, wherein the indication of the capability is carried in a capability field in the message 3.

6. The method of claim 1, wherein the determining the particular repetition factor based on at least one of the set of candidate repetition factors and the dynamic indication further comprises:

determining the set of candidate repetition factors includes only one repetition factor; and determining that the dynamic indication is not received, wherein the particular repetition factor is determined to be the one repetition factor in the set of candidate repetition factors.

7. The method of claim 1, wherein the determining the particular repetition factor based on at least one of the set of candidate repetition factors and the dynamic indication further comprises:

determining the set of candidate repetition factors includes more than one repetition factors; and receiving the dynamic indication that selects the particular repetition factor from the set of candidate repetition factors.

8. The method of claim 1, further comprising:

determining whether a frequency hopping parameter is included in the SIB; and in response to determining that the frequency hopping parameter is included, transmitting the ACK or the NACK of the message 4 in the PUCCH and/or other PUCCH transmissions using a PUCCH-ConfigCommon information element with frequency hopping in accordance with the frequency hopping parameter.

9. The method of claim 8, wherein the frequency hopping parameter indicates one of:

no frequency hopping, intra-slot frequency hopping, or inter-slot frequency hopping.

10. A method of wireless communication of a user equipment (UE), comprising:

performing at least one of a first determination of (a) whether a Bandwidth Part (BWP) selected for a random access procedure is configured with a set of random access (RA) resources indicating Msg3 repetition and Msg4 Hybrid Automatic Repeat Request (HARQ) acknowledgement (ACK) repetition as well as other RA resources not indicating Msg3 repetition or Msg4 HARQ ACK repetition and (b) whether a reference signal received power (RSRP) of a downlink reference signal is less than a threshold; and a second determination of whether the BWP is configured with the set of RA resources indicating the Msg3 repetition and the Msg4 HARQ ACK repetition and is configured with no other RA resources;

in response to one of the first determination and the second determination being true, determining that both Msg3 repetition and Msg4 HARQ-ACK repetition are applicable for the random access procedure.

11. The method of claim 10, further comprising:

in response to none of the first determination and the second determination being true, performing at least one of a third determination of (a) whether the BWP is configured with a set of RA resources indicating the Msg3 repetition as well as other RA resources not indicating Msg3 repetition and (b) whether the RSRP of the downlink reference signal is less than the threshold; and a fourth determination of whether the BWP is configured with the set of RA resources indicating the Msg3 repetition and is configured with no other RA resources;

in response to one of the third determination and the fourth determination being true, determining that the Msg3 repetition is applicable for the random access procedure.

12. The method of claim 10, further comprising:

in response to none of the first determination and the second determination being true, performing at least one of a third determination of (a) whether the BWP is configured with a set of RA resources indicating the Msg4

HARQ ACK repetition as well as other RA resources not indicating the Msg4 HARQ ACK repetition and (b) whether the RSRP of the downlink reference signal is less than the threshold; and a fourth determination of whether the BWP is configured with the set of RA resources indicating the Msg4 HARQ ACK repetition and is configured with no other RA resources;

in response to one of the third determination and the fourth determination being true, determining that the Msg4 HARQ-ACK repetition is applicable for the random access procedure.

13. An apparatus for wireless communication, the apparatus being a user equipment (UE), comprising:

a memory; and at least one processor coupled to the memory and configured to:

receive, from a base station, a system information block (SIB);

determine whether the SIB includes a set of candidate repetition factors for physical uplink control channel (PUCCH) transmissions;

in response to determining that the SIB includes the set of candidate repetition factors:

determine whether a reference signal received power (RSRP) threshold is included in the SIB;

measure an RSRP of a downlink reference signal; and determine whether the measured RSRP is lower than the RSRP threshold when the RSRP threshold is configured in the SIB;

transmit, to the base station in a message of a random access procedure, an indication of a capability of the UE for PUCCH repetition, wherein the indication of the capability is transmitted further in response to a determination that the measured RSRP is lower than the RSRP threshold;

when the UE has the capability:

determine a particular repetition factor based on at least one of the set of candidate repetition factors and a dynamic indication of a repetition factor; and transmit an acknowledgement (ACK) or negative acknowledgement (NACK) of a message 4 of the random access procedure in a PUCCH in accordance with the particular repetition factor.

14. The apparatus of claim 13, wherein the at least one processor is further configured to:

in response to determining that the SIB includes the set of candidate repetition factors and that the measured RSRP is not lower than the RSRP threshold, transmit the ACK or the NACK of the message 4 in the PUCCH without repetition; and in response to determining that the SIB does not include the set of candidate repetition factors, transmit the ACK or the NACK of the message 4 in the PUCCH without repetition.

15. The apparatus of claim 13, wherein the at least one processor is further configured to:

receive, from the base station, the dynamic indication of the repetition factor in at least one of a message 2 of the random access procedure, the message 4, or downlink control information (DCI) scheduling the message 4.

16. The apparatus of claim 13, wherein the indication of the capability is transmitted in a message 1 or a message 3 of the random access procedure.

17. The apparatus of claim 16, wherein the indication of the capability is carried in a capability field in the message 3.

18. The apparatus of claim 13, wherein to determine the particular repetition factor based on at least one of the set of candidate repetition factors and the dynamic indication, the at least one processor is further configured to:

determine the set of candidate repetition factors includes only one repetition factor; and determine that the dynamic indication is not received, wherein the particular repetition factor is determined to be the one repetition factor in the set of candidate repetition factors.

* * * * *